UNITED STATES PATENT OFFICE.

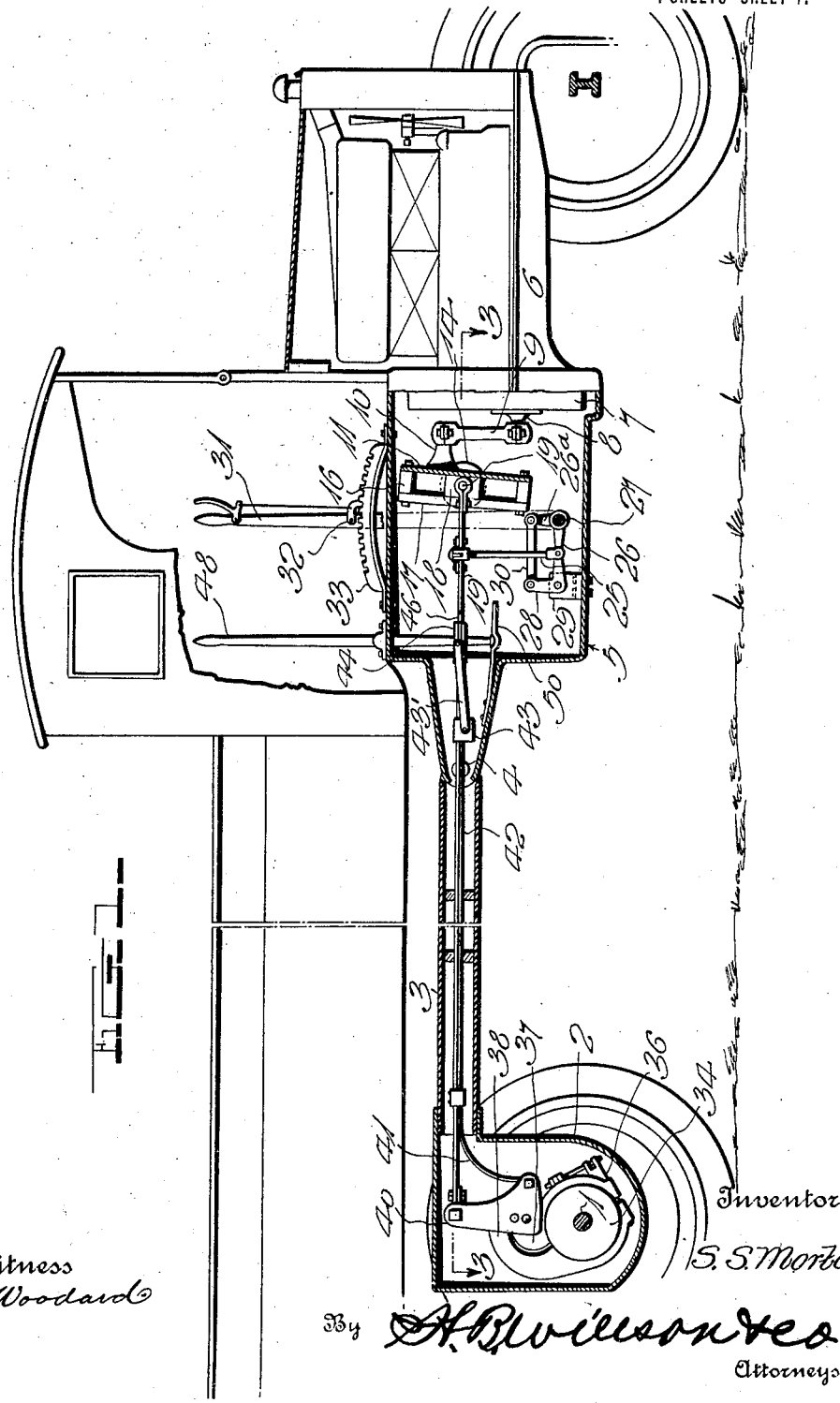

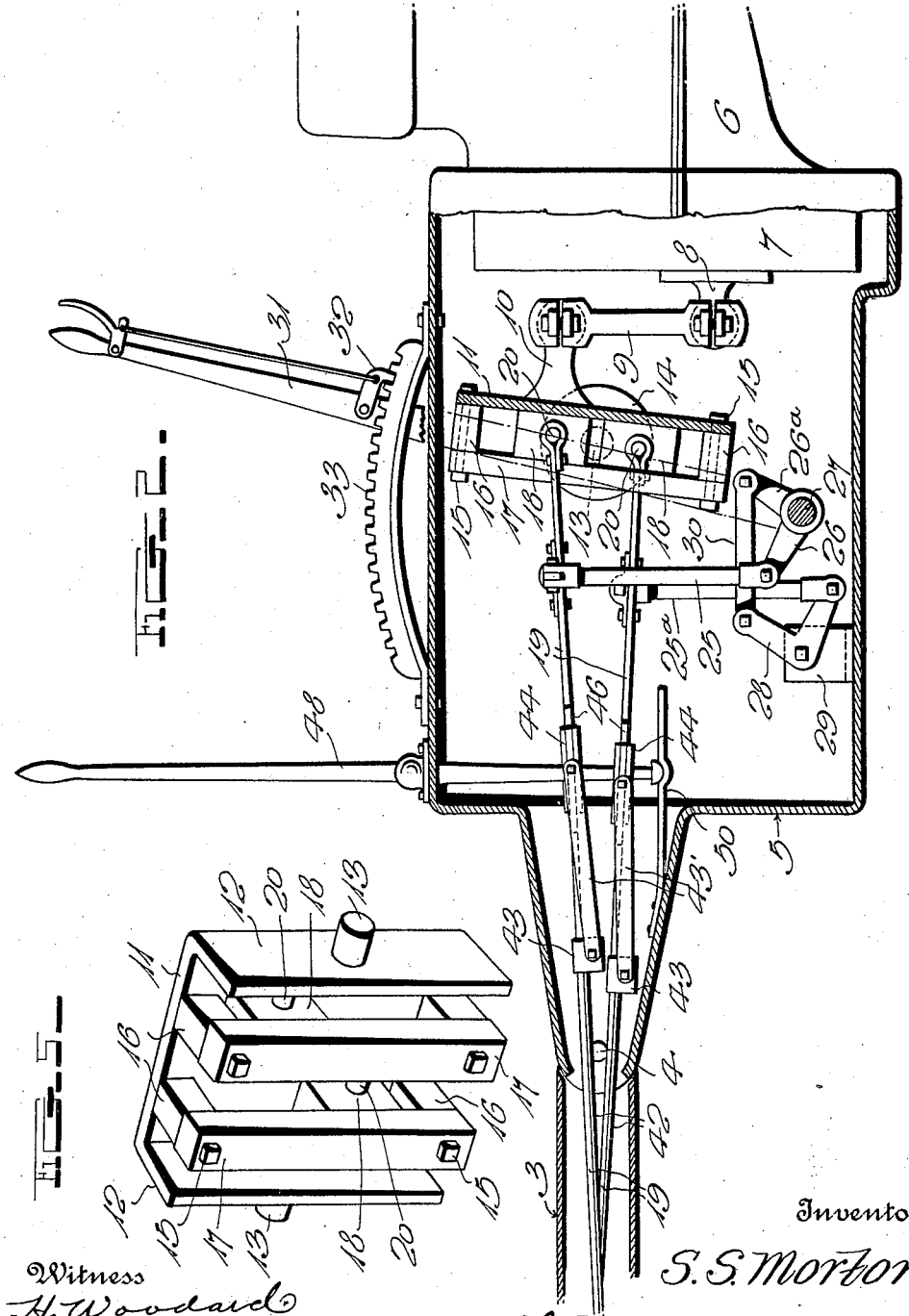

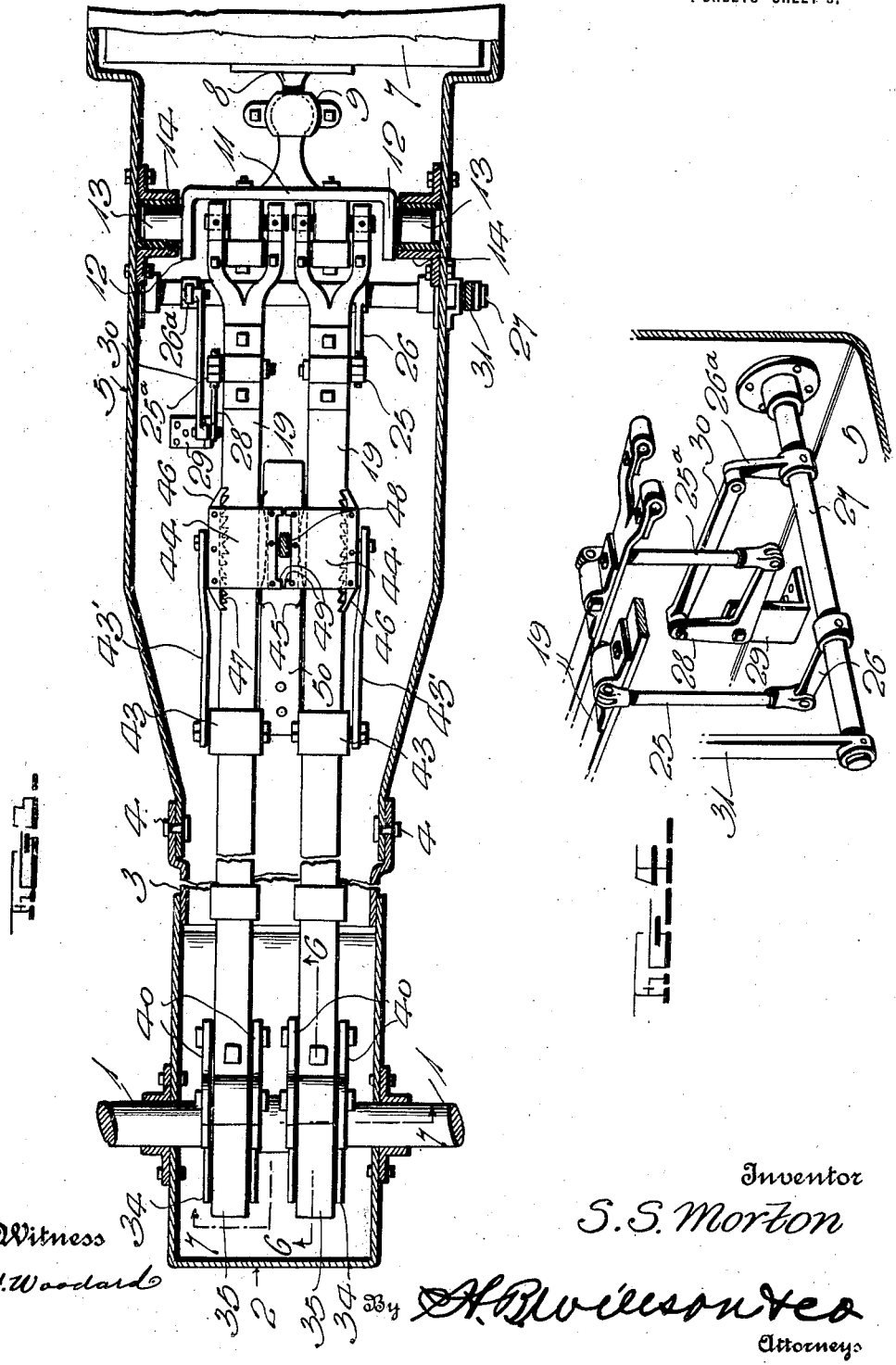

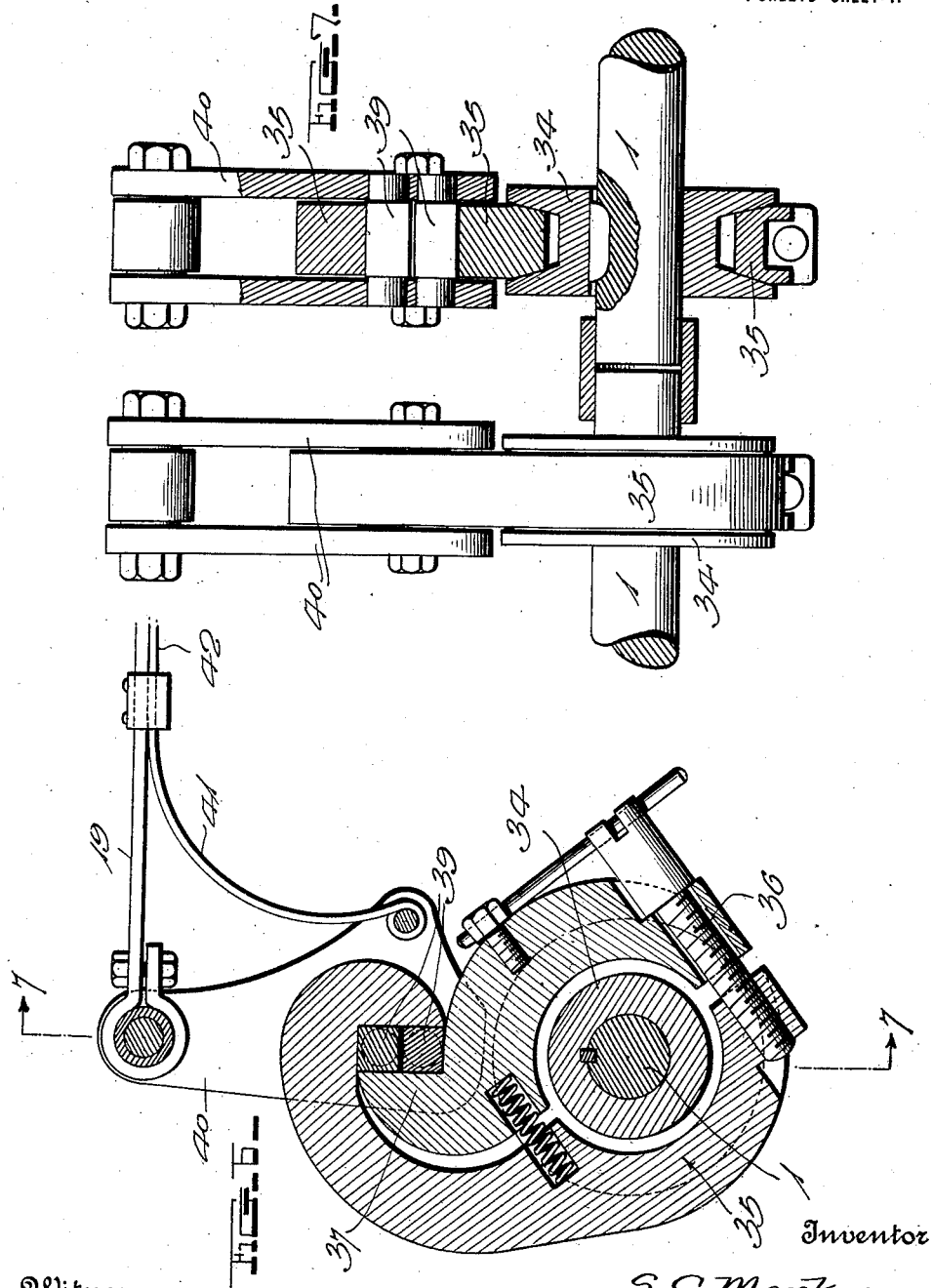

SAMUEL S. MORTON, OF PHILADELPHIA, PENNSYLVANIA.

AUTOMOBILE TRANSMISSION.

1,427,541. Specification of Letters Patent. Patented Aug. 29, 1922.

Application filed June 27, 1921. Serial No. 480,699.

*To all whom it may concern:*

Be it known that I, SAMUEL S. MORTON, a citizen of the United States, residing at Philadelphia, in the county of Philadelphia and State of Pennsylvania, have invented certain new and useful Improvements in Automobile Transmissions; and I do declare the following to be a full, clear, and exact description of the invention, such as will enable others skilled in the art to which it appertains to make and use the same.

My invention relates to improvements in transmission mechanisms and more particularly to those which are designed primarily for use on motor trucks and other motor vehicles, although not restricted to this particular field of use.

One object of the invention is to provide a novel transmission mechanism by which the car may be driven at different speeds or brought to a standstill without the necessity of employing a clutch or using any gears.

In carrying out the above end, intermittent grip devices are employed on the rear axle of the machine or on any other appropriate shaft and reciprocating connecting rods are employed for operating said intermittent grip devices to turn the axle, and a further object is to provide a novel mechanism for reciprocating the connecting rods oppositely and gradually increasing or decreasing the speed, and for discontinuing the stroking of said connecting rods when the machine is to be stopped.

The intermittent grip devices are of a type necessitating that their operating levers be initially canted before said devices will be operated by stroking of the connecting rods, and a further object of my invention is to provide a unique arrangement of parts for effecting the necessary canting of said levers, so as to cause the intermittent grip devices to drive either forwardly or rearwardly.

Yet another object of the invention is to provide a novel intermittent grip device which will operate to equal advantage for forward or rearward driving.

With the foregoing and minor objects in view, the invention resides in the combination and construction of parts hereinafter described and claimed, the descriptive matter being supplemented by the accompanying drawings.

Figure 1 is a longitudinal sectional view, partly in elevation, showing my invention installed upon a motor truck, the transmission mechanism being set at a neutral point.

Figure 2 is an enlarged sectional view similar to Fig. 1, but showing the transmission mechanism set for operation.

Figure 3 is a horizontal sectional view partly in elevation, as indicated by line 3—3 of Fig. 1.

Figure 4 is a perspective view of the mechanism employed for varying the speed adjustments.

Figure 5 is a perspective view of the oscillatory operating plate and the shoes thereon for reciprocating the connecting rods.

Figure 6 is an enlarged vertical sectional view of one of the intermittent grip devices as indicated by line 6—6 of Fig. 3.

Figure 7 is a vertical sectional view as indicated by lines 7—7 of Figs. 3 and 6.

In the drawings above briefly described, I have shown a motor truck embodying my invention. At the center of the usual rear axle casing which encloses the rear axle sections 1, is a casing 2 which takes the place of the usual differential casing, while leading forwardly from the upper end of said casing 2, is a relatively long and narrow casing 3 which is pivoted at 4 to the rear end of a transmission casing 5. This last-named casing is here shown connected rigidly with the rear end of an automobile motor 6, but this arrangement is not absolutely essential. In the front end of the casing 5 and preferably mounted on the fly-wheel 7 of the motor 6, is a wrist-pin 8 from which a pitman 9 rises to an arm 10 extending forwardly from a transverse vertically disposed operating plate 11 which is mounted for forward and rearward oscillation. In the present showing, the ends of the plate 11 are provided with laterally extending flanges 12 having trunnions 13 located centrally between the upper and lower edges of the plate, these trunnions being rockably mounted in appropriate bearings 14 carried by the sides of the transmission casing 5. Secured to the plate 11 by bolts or the like 15 and spaced in rear of said plate by appropriate blocks 16, are two vertical tracks 17 which are disposed in parallel relation with the plate as shown. A pair of shoes 18 are slidably received between the tracks 17 and the plate 11 and the forked front ends of a pair of rearwardly extending connecting rods 19 are connected with said shoes respectively, by appropriate means 20. The connecting rods 19 extend rearwardly through the casing 3 and are connected with a pair of intermittent grip devices located in casing 2, as will be hereinafter described fully.

When the shoes 18 are adjusted vertically so that the connections 20 come in axial alinement with the trunnions 13, oscillation of the operating plate 11 will produce no reciprocation of the connecting rods 19 (see Fig. 1) and hence the motor 6 may be allowed to operate without producing any motion of the vehicle. When one shoe 18 is moved upwardly to any extent whatever and the other downwardly however (see Fig. 2) the connecting rods 19 will stroke in opposite directions and will operate the intermittent grip devices to propel the vehicle either forwardly or rearwardly, according to the manner in which said grip devices are set by the means hereinafter described. For adjusting the shoes 18 in the proper manner, any appropriate means can well be provided. I prefer however to employ the construction shown most clearly in Figs. 2 and 4. A pair of links 25 and 25ª are connected with and depend from the connecting rods 19 respectively, the lower end of link 25 being pivoted to a rearwardly extending crank arm 26 of a control shaft 27 which extends across the lower portion of the transmission casing 5. The link 25ª is connected with a bell crank 28 fulcrumed on an appropriate bracket 29 carried by the bottom of the casing 5 and from this bell crank, a link 30 leads forwardly to a crank arm 26ª on the shaft 27. Arm 26ª extends upwardly whereas arm 26 extends rearwardly in a horizontal direction, the result being that when shaft 27 is rocked, the operating connections between said shaft and the connecting rods 19 will shift one of said rods upwardly and the other downwardly, thereby similarly moving the shoes 18 so as to produce opposite stroking of said connecting rods and alternate operation of the intermittent grip devices.

While any adequate means may be employed for turning the shaft 27, I have shown a hand lever 31 thereon extending within easy reach of the driver, said lever being provided with a dog 32 coacting with a rack 33 for holding it in adjusted position.

Each section 1 of the rear axle is provided with a peripherally grooved drum 34 surrounded by a two-part band 35 whose sections are by preference connected adjustably by an appropriate screw 36. The ends of the band 35 are disposed in overlapping relation and are extended respectively outwardly and inwardly as indicated at 37 and 38. these ends 37 and 38 being disposed on substantially radial lines and in parallel relation with each other. A pair or fulcrum pins 39 carried by a bifurcated operating lever 40 are positioned between the ends 37 and 38 and when said lever is moved in on direction or the other, after being initially canted to contract the band 35 around the drum 34, said fulcrum pins 39 will draw said band tightly around the drum in an anti-slipping manner, thereby causing the motion of the lever 40 to be transmitted to the shaft 1 to turn the latter. The connecting rods 19 are pivoted respectively to the levers 40 and when these levers are canted in one direction, reciprocation of said connecting rods will cause forward turning of the shaft or axle section 1, but when the levers in question are canted in the opposite direction, reverse driving will occur. For effecting this canting of the levers 40, the construction described below is employed.

A pair of curved springs 41 are connected at their lower ends with the levers 40 respectively, at points in advance of the fulcrum pins 39, said springs being preferably formed by downwardly bending the rear ends of a pair of spring bars 42. These bars extend forwardly under the connecting rods 19 and have their front ends suitably attached to slides 43 mounted on said connecting rods. I have shown links 43' extending forwardly from the slides 43 and attached to additional slides 44 on the connecting rods 19. The slides 44 are normally shifted laterally in one direction on the connecting rods 19 by means of suitable springs 45 so as to interengage dogs 46 carried by said slides with teeth 47 with which the outer edges of the connecting rods are provided, whereby to lock the slides 44 and consequently the spring bars 42 and the springs 41 to said connecting rod for movement bodily therewith. When the slides 44 are shifted laterally to disengage the dogs 46 from the teeth 47 and then shifted longitudinally upon the connecting rods 19 in one direction, the springs 41 act to cant the levers 40 for driving in one direction. When the slides 44 are oppositely adjusted however the levers 40 and their intermittent grip devices are set for driving in the reverse direction.

For shifting the slides 44 in the required manner, I have shown a hand lever 48 whose lower end is positioned between said slides and is adapted to engage stops or shoulders 49 thereon, in order to move either slide longitudinally. The shoulders 49 of each slide are spaced apart sufficiently to prevent stroking of the connecting rods 19 and slides 44, from continually oscillating the lever 48 and before any adjustment is made my means of this lever the lever 31 must be set to neutrally position the shoes 18, as seen in Fig. 1. Then, the slides 44 may be adjusted either forwardly or rearwardly as necessary and the moment they are released, the dogs 46 and teeth 47 will interengage to lock the slides to the connecting rods 19, thereby holding the springs 41 under tension.

I preferably attach a spring 50 to the transmission casing 5 for coaction with the lower end of the lever 48 to normally hold the latter in a neutral position, but the tension of this spring may be readily overcome when the lever is to be operated.

From the foregoing, taken in connection with the accompanying drawings, it will be seen that I have produced a comparatively simple yet a highly efficient and reliable mechanism for transmitting power at various speeds from a prime mover to a shaft, and that the speed may be increased or decreased without any lull whatever in the transmission of power and without any jerks such as those occasioned when variable speed driving gears are used in connection with a clutch which must be operated whenever gears are being shifted. The invention operates for driving either forwardly or rearwardly at a great variety of speeds, eliminates the clutch, transmission gears, and differential, and any necessary relative turning of the rear wheels is permitted by turning of the drums 34 in the bands 35, as said bands move on their return strokes.

Since excellent results may be obtained with the details disclosed, they may be followed if desired but I wish it understood that within the scope of the invention as claimed, numerous changes may be made.

I claim:

1. A transmission mechanism comprising a pivotally mounted operating member having a pair of parallel guideways extending across and from opposite sides of its pivotal axis, a pair of shoes slidably engaged with said guideways respectively, means for adjusting said shoes oppositely along said guideways, a pair of shaft-driving intermittent grip devices spaced from said operating member, connecting rods between said shoes and said intermittent grip devices respectively, and means for oscillating said operating member.

2. A transmission mechanism comprising a pivotally mounted plate, parallel tracks carried by said plate and spaced from one side thereof, a pair of shoes slidably received between said tracks and said plate, means for oscillating said plate, a pair of shaft-driving intermittent grip devices spaced from said plate, a pair of connecting rods leading from said intermittent grip devices to said shoes respectively, and means for adjusting said shoes oppositely along said tracks.

3. A transmission mechanism comprising a pivotally mounted operating member having a pair of parallel guideways extending across and from opposite sides of its pivotal axis, a pair of shoes slidably engaged with said guideways respectively, a pair of shaft-driving intermittent grip devices spaced from said operating member, connecting rods extending from said intermittent grip devices to said shoes respectively, a pair of links pivoted to and extending in the same direction from said connecting rods, a control shaft having a crank arm to which one of said control links is pivoted a lever adjacent said control shaft, an additional link pivoted to said lever, another crank arm on said control shaft to which said additional link is pivoted, and means for turning said control shaft and holding it in adjusted position.

4. A transmission mechanism comprising an intermittent grip device having an operating lever, a connecting rod extending from said lever, means for reciprocating said connecting rod, a spring connected to said lever for initially canting the same, and means adjustable along said rod and connected with said spring for controlling the action of the latter.

5. A transmission mechanism comprising an intermittent grip device having an operating lever, a connecting rod extending from said lever, means for reciprocating said connecting rod, a spring connected to said lever for initially canting the same, a slide mounted on said connecting rod and having connection with said spring, means for adjusting said slide along said connecting rod to control the action of said spring, and means for securing said slide to the connecting rod when adjusted.

6. A transmission mechanism comprising an intermittent grip device having an operating lever, a connecting rod extending from said lever, means for reciprocating said connecting rod, a spring connected to said lever for initially canting the same, a slide mounted on said connecting rod and having longitudinal and transverse movement thereon, said slide being connected with said springs, interengaging teeth on said slide and rod operable when said slide is shifted laterally in one direction, a spring for so shifting said slide, and means for shifting said slide laterally in the other direction to release said teeth and for then moving said slide longitudinally.

7. A transmission mechanism comprising an intermittent grip device having an operating lever, a connecting rod extending from said lever, means for reciprocating said connecting rod, a spring bar slidable along said connecting rod and having one end turned laterally and connected to said lever for initially canting the latter, and means for connecting said spring bar to said connecting rod when moved to tension its laterally turned end.

8. A transmission mechanism comprising a pair of intermittent grip devices each having an operating lever, a pair of connecting rods extending from said levers, means for reciprocating said rods, springs for initially canting said levers, means including slides on said rods for setting said springs, and a single control lever engageable with either of said slides for adjusting the same to control the action of its respective spring.

9. A transmission mechanism comprising a drum, a friction band surrounding said drum and having an operating lever, a connecting rod extending from said lever, means for reciprocating said rod, a spring connected to said lever for initially canting the same, and means adjustable in either direction along said rod for tensioning said spring to cant said lever in either direction.

10. An intermittent grip device comprising a drum, a split friction band operatively associated with said drum and having radially directed ends disposed in directly opposed parallel relation with each other and a floating operating lever having fulcrum means received between said radial ends for spreading them when the lever is operated.

11. An intermittent grip device comprising a drum, a split friction band surrounding said drum and having overlapping end portions, the inner and outer end portions of said band being directed radially outward and inward respectively into spaced parallel relation, and a floating operating lever having fulcrum means received between the parallel ends of said band for spreading them when the lever is operated.

12. A structure as specified in claim 10, together with spring means for initially canting said lever.

13. A structure as specified in claim 10, together with spring means active in either of two directions for initially canting said lever in either direction.

14. A structure as specified in claim 10, together with an operating rod extending from said lever, and a spring device associated with said lever and rod for initially canting the former.

15. A structure as specified in claim 10, together with an operating rod extending from said lever, and a spring device adjustable along said rod and connected with said lever for initially canting the latter.

In testimony whereof I have hereunto set my hand.

SAMUEL S. MORTON.